(12) United States Patent
Dinis

(10) Patent No.: US 12,173,820 B2
(45) Date of Patent: Dec. 24, 2024

(54) CONNECTORS

(71) Applicant: Goodrich Actuation Systems SAS, Saint-Marcel (FR)

(72) Inventor: David Dinis, Puteaux (FR)

(73) Assignee: GOODRICH ACTUATION SYSTEMS SAS, Saint Ouen l'Aumone (FR)

( * ) Notice: Subject to any disclaimer, the term of this patent is extended or adjusted under 35 U.S.C. 154(b) by 0 days.

(21) Appl. No.: 18/156,776

(22) Filed: Jan. 19, 2023

(65) Prior Publication Data
US 2023/0228352 A1    Jul. 20, 2023

(30) Foreign Application Priority Data

Jan. 19, 2022   (EP) ................................... 22-305055

(51) Int. Cl.
*F16L 23/02*    (2006.01)
*F16L 23/00*    (2006.01)

(52) U.S. Cl.
CPC ............. *F16L 23/02* (2013.01); *F16L 23/003* (2013.01)

(58) Field of Classification Search
CPC ...... F16L 23/02; F16L 27/0816; F16L 41/086
See application file for complete search history.

(56) References Cited

U.S. PATENT DOCUMENTS

| 457,503 | A | * | 8/1891 | Ball | ................... F16L 27/0816 285/347 |
| 676,846 | A | | 6/1901 | Moran | |
| 1,460,105 | A | | 6/1923 | Malone | |
| 1,998,632 | A | * | 4/1935 | McLaughlin | ....... F16L 27/0816 285/341 |
| 2,536,292 | A | | 1/1951 | Kollsman | |

(Continued)

FOREIGN PATENT DOCUMENTS

| DE | 272344 A1 * | 10/1989 | |
| DE | 102006061055 A1 * | 7/2008 | ............ F16L 41/086 |

(Continued)

OTHER PUBLICATIONS

European Search Report for Application No. 22305055.0, mailed Jun. 10, 2022, 11 pages.

*Primary Examiner* — Zachary T Dragicevich
*Assistant Examiner* — James A Linford
(74) *Attorney, Agent, or Firm* — CANTOR COLBURN LLP

(57) ABSTRACT

A connection apparatus suitable for mounting on a structural element and connection to a port of a system or component in which the connection apparatus comprises a connector, a flange and a compressible biasing element is provided. The connector forms a longitudinally extending conduit having an axis (A) extending along the centre of the conduit, a port end adapted to be engaged with the port of a system or component, and a second end. The connector comprises a shoulder extending around the perimeter of the connector, and the shoulder extends around the perimeter of the connector in a direction substantially perpendicular to the portion of the conduit axis (as) around which the shoulder extends. The biasing element is adapted to at least partially extend around a portion of the connector adjacent to the shoulder.

9 Claims, 4 Drawing Sheets

(56) References Cited

U.S. PATENT DOCUMENTS

| | | | | |
|---|---|---|---|---|
| 3,001,804 A | * | 9/1961 | Tomlinson | F16L 27/12 |
| | | | | 285/137.11 |
| 3,649,052 A | * | 3/1972 | Snyder, Jr. | F16L 27/0816 |
| | | | | 285/38 |
| 3,828,823 A | * | 8/1974 | Douglas | F16L 58/187 |
| | | | | 285/55 |
| 5,674,087 A | | 10/1997 | Kirma | |
| 5,722,846 A | | 3/1998 | Lazaro, Jr. | |
| 6,073,973 A | | 6/2000 | Boscaljon et al. | |
| 9,876,315 B2 | | 1/2018 | Mellor et al. | |
| 2007/0246108 A1 | | 10/2007 | Conway | |
| 2011/0031740 A1 | * | 2/2011 | Stone | F16L 41/14 |
| | | | | 285/139.2 |
| 2020/0028296 A1 | | 1/2020 | Ibarra et al. | |

FOREIGN PATENT DOCUMENTS

| | | |
|---|---|---|
| GB | 641125 A | 8/1950 |
| WO | 2019239177 A1 | 12/2019 |

* cited by examiner

CONNECTORS

CROSS-REFERENCE TO RELATED APPLICATIONS

This application claims priority to European Patent Application No. 22305055.0 filed Jan. 19, 2022, the entire contents of which is incorporated herein by reference.

TECHNICAL FIELD

This disclosure relates to connectors, and in particular to connectors that may be aligned with the element to which the connector is to be connected.

BACKGROUND

In some forms of manufacturing the item being manufactured is constructed of a plurality of separate systems or components which are required to be in electrical and/or fluid communication with each other. For example, in the construction of an aircraft various systems or components such as, but not be limited to, one or more engines, a fuel supply system, a source of pressurised fluid, control systems, or cooling systems are in electrical and/or fluid communication with one or more other systems or components.

The connectors used to facilitate such communication between systems or components typically form a conduit through which fluid or electrical wires may pass. The connectors are part of a connection system which includes one or more elements that retain the connector in a fixed position relative to a structural element on which the connector is mounted. That structural element may be a frame or a part of a system or component.

The connector is adapted to be connected to a suitably configured port that is part of a system or component. The connector is connected to the port by a known means, for example by configuring the connector and port as a compression fitting.

It is known that if the connector and port are not correctly aligned with each other, then, dependent on the degree of misalignment, the connection between the connector and the port may be weak and/or not fluid tight and/or outside of design specification for a small degree of misalignment. The connection may not be possible at all for a larger degree of misalignment.

SUMMARY

According to a first aspect of the present invention there is provided a connection apparatus suitable for mounting on a structural element and connection to a port of a system or component in which the connection apparatus comprises a connector, a flange and a compressible biasing means. The connector forms a longitudinally extending conduit having an axis extending along the centre of the conduit, a port end adapted to be engaged with the port of a system or component, and a second end. The connector comprises a shoulder extending around the parameter of the connector. The shoulder extends around the perimeter of the connector in a direction substantially perpendicular to the portion of the conduit axis around which the shoulder extends. The biasing means is adapted to at least partially extend around a portion of the connector adjacent to the shoulder. The flange is adapted to at least partially extend around a portion of the connector adjacent to the shoulder between the shoulder and the port end of the connector, and to be fixed to the structural element in a fixed position. The flange, shoulder and biasing means are so configured that fixing the flange to the structural element in the fixed position traps the shoulder and the biasing means between the flange and the structural element, and the biasing means is partially but not fully compressed when the flange is in the fixed position.

The conduit axis extends along the geometrical centre of the conduit. As such, the conduit axis may not extend in a straight line or have the same orientation along the whole length of the conduit axis.

In an embodiment of the above embodiment the connector is substantially tubular and the conduit formed by the connector has substantially the same cross-section as the connector in a plane perpendicular to the conduit axis.

In an embodiment of any of the above embodiments the connector is substantially tubular with a substantially circular cross-section in a plane perpendicular to the conduit axis.

In an embodiment of any of the above embodiments the connector is so configured that the orientation of the conduit axis at the port end is different to the orientation of the conduit axis at the second end. In some embodiments the connector is approximately L shaped and the orientation of the conduit axis at the port end is at an angle of approximately 90 degrees to the orientation of the conduit axis at the second end.

In an embodiment of any of the above embodiments the shoulder extending around the connector is a thickening of the connector extending in an outward radial direction from the portion of the conduit axis surrounded by the shoulder.

In an embodiment of any of the above embodiments the shoulder extending around the connector has first and second radially extending faces which each face in an axial direction (based on the orientation of the portion of the conduit axis surrounded by the shoulder).

In an embodiment of any of the above embodiments one or both of the first and second radially extending faces are also axially extending.

In an embodiment of any of the above embodiments the first and second radially extending faces are substantially parallel to each other.

In an embodiment of any of the above embodiments the biasing means extends fully around the portion of the connector adjacent the shoulder.

In an embodiment of any of the above embodiments the flange extends fully around the portion of the connector adjacent the shoulder.

In an embodiment of any of the above embodiments the flange is so configured that the flange can be fixed to the structural element using one or more threaded bolts, screws or alternative appropriate fixing means.

In an embodiment of any of the above embodiments the fixed position is a position at which the flange cannot move any further toward the structural element. In some embodiments that is because the flange is in contact with a surface of the structural element. In other embodiments, there are one or more stop elements that prevent the flange from moving further towards the structural element whilst the structural element is spaced from the structural element or the main part of the structural element.

In an embodiment of any of the above embodiments the trapping of the shoulder and biasing means between the flange and the structural element is such that the shoulder and biasing means are not able to move out of the space between the flange and the structural element.

In an embodiment of any of the above embodiments the biasing means is so configured that the partial but not full compression of the biasing means causes the biasing means to bias the shoulder against the structural element or flange and that bias is sufficient to inhibit the connector from moving laterally or rotationally relative to the flange.

Because the biasing means is, however, not fully compressed, further compression of the biasing means allows the shoulder to move in an axial direction. The movement in the axial direction allows the shoulder to come out of contact with the structural element or flange and the connector to at least rotate about the conduit axis within the space between the flange and structural element. In some embodiments there may be some lateral movement of the connector relative to the structural element. This is beneficial because the alignment or orientation of the port end of the conduit may be altered on rotation of the connector, and the relative position of the port end of the conduit may be altered on lateral movement of the connector.

The rotation of the shoulder and connector is inhibited when the biasing means is biasing the shoulder against the structural element or flange because of friction between the shoulder and structural element or flange. This friction has the result that much greater force is required to be able to alter the alignment of the port end of the conduit than if the biasing means is further compressed as described above.

In an embodiment of any of the above embodiments one or both of the portion of the shoulder that contacts the structural element or flange and the portion of the structural element or flange that contacts the shoulder are configured to have a higher coefficient of friction than the rest of the shoulder or structural element or flange.

The use of friction between the shoulder and structural element or flange to inhibit realignment of the connector has the effect that there is no indexing of the alignment of the port end. This allows very fine adjustment to the alignment of the port end to be made.

In an embodiment of any of the above embodiments the biasing means may be further compressed by application of a force to the connector, in which at least part of the force is applied in the same direction as the portion of the conduit axis around which the shoulder extends.

In an embodiment of any of the above embodiments the application of the force to the connector may be a person pushing or pulling on the connector in a direction that includes a component of the direction that is parallel with the portion of the conduit axis surrounded by the shoulder. The biasing means may be configured, structured or calibrated so that a predetermined minimum force in the conduit axis direction is needed to further compress the biasing means.

In an embodiment of any of the above embodiments the biasing means is located between the shoulder and the second end of the connector. This has the result that a user will need to push on the connector in a direction towards the second end of the connector so as to further compress the biasing means. Thus to realign the port end of the connector a user may push and rotate the connector.

In an embodiment of any of the above embodiments the biasing means is located between the shoulder and the flange. This has the result that a user will need to pull on the connector in a direction away from the second end of the connector so as to further compress the biasing means. Thus to realign the port end of the connector a user may pull and rotate the connector.

In an embodiment of any of the above embodiments the biasing means is a compression spring. For example a helical spring.

In an embodiment of any of the above embodiments the biasing means is a wave spring. In an embodiment of any of the above embodiments the wave spring may be one of a multi-turn wave spring, a single-turn wave spring or a nested wave spring. An advantage of the biasing means being a wave spring is that wave springs have a smaller length (in the direction of compression) than helical springs.

In an embodiment of any of the above embodiments the flange is a split flange. An advantage of split flanges is that they are easily placed around the connector and do not need to contain an aperture that allows the port end of the connector to be passed through the flange.

In an embodiment of any of the above embodiments the conduit defined by the connector comprises the port end, the second end, and at least one further aperture through which communication with the inside of the conduit may occur.

According to a second aspect of the present disclosure, there is provided a connection system comprising a connection apparatus according to the first aspect of the present disclosure and a structural element.

In an embodiment of any of the above embodiments the structural element comprises a passage through which the portion of the connector between the shoulder and the port end or the second end may extend, and through which the shoulder may not pass. This allows the shoulder to be trapped between the structural element and the flange.

In an embodiment of any of the above embodiments the structural element comprises a first recess, the first recess extends around an end of the passage, and the first recess is configured to receive the shoulder.

In an embodiment of any of the above embodiments the first recess may be a recess in the surface of the structural element. The first recess is defined by a first recess base and one or more first recess walls that extend between the surface of the structural element and the first recess base. In some embodiments the first recess base is substantially parallel to the surface of the structural element surrounding the first recess. The passage has an end which opens through the first recess base, and the passage is so positioned that there is a portion of the first recess base extending from the mouth of the passage to the or a first recess wall around the whole of the mouth of the passage. The shoulder or the biasing means are in contact with some or substantially all of the first recess base when the shoulder and biasing means are trapped between the structural element and flange.

In an embodiment of any of the above embodiments the first recess is configured to receive the shoulder and to allow the shoulder to rotate around the portion of the conduit axis surrounded by the shoulder within the first recess.

In an embodiment of any of the above embodiments the structural element comprises a second recess, the second recess is configured to receive the flange, and the second recess extends around the first recess.

In an embodiment of any of the above embodiments the second recess is defined by a second recess base and one or more second recess walls that extend between the surface of the structural element and the second recess base. In some embodiments the second recess base is substantially parallel to the surface of the structural element surrounding the second recess. The first recess is a recess in the second recess base and is defined by a first recess base and one or more first recess walls that extend between the second recess base and the first recess base. In some embodiments the first recess base is substantially parallel to the surface of the structural element surrounding the second recess. In some embodiments, the first recess is so positioned that there is a portion of the second recess base extending from the mouth of the first recess to the or a second recess wall around the whole of the mouth of the first recess. The flange is in contact with some or substantially all of the second recess base when the shoulder and biasing means are trapped between the structural element and flange. In some embodiments the surface of the flange remote from the second end of the connector is substantially flush with the surface of the structural element surrounding the second recess. The passage has an end which opens through the first recess base, and the passage is so positioned that there is a portion of the first recess base extending from the mouth of the passage to the or a first recess wall around the whole of the mouth of the passage. The shoulder or the biasing means are in contact with some or substantially all of the first recess base when the shoulder and biasing means are trapped between the structural element and flange.

In an embodiment of any of the above embodiments, the first recess and the second recess each define a cylindrical volume, and those cylindrical volumes are coaxial.

According to a third aspect of the present disclosure there is provided an aircraft comprising one or both of one or more connection apparatus according to the first aspect of the present disclosure, and one or more connection systems according to the second aspect of the present disclosure.

BRIEF DESCRIPTION OF DRAWINGS

The present invention will be further described and explained by way of example with reference to the accompanying drawings in which.

DETAILED DESCRIPTION

Figure 1:
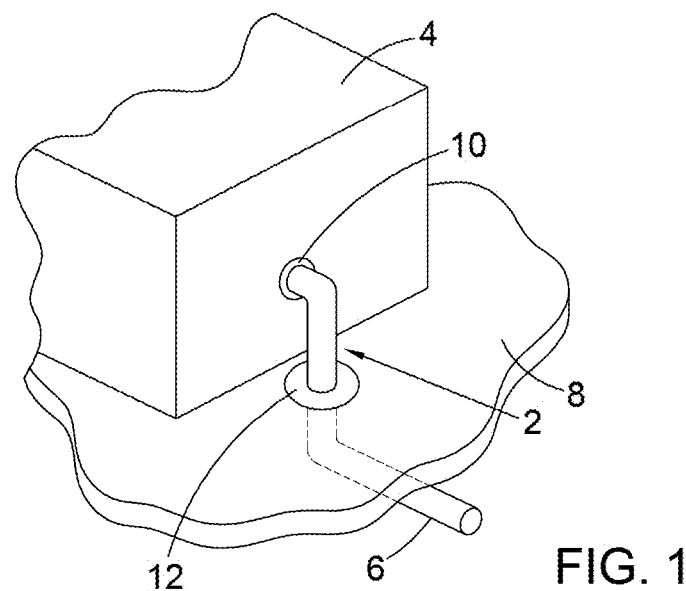
FIG. 1 shows a schematic view of an embodiment of a connection system according to the present disclosure connected to a system or component and a conduit.

With reference to FIG. 1, a connection apparatus 2 is connected to a conduit 6 and a system or component 4. The connection apparatus 2 is connected to the system 4 via a system port 10 and suitable connection means 30 (shown in FIG. 2). The system port 10 is the end of one or more system conduits (not shown) located within the system 4. In the embodiment shown in FIG. 1, the system 4 may be a hydraulic pump and the system conduits, connection apparatus 2 and conduit 6 are all part of a hydraulic system. In other embodiments the system 4 has other functions and/or constructions.

Figure 2:
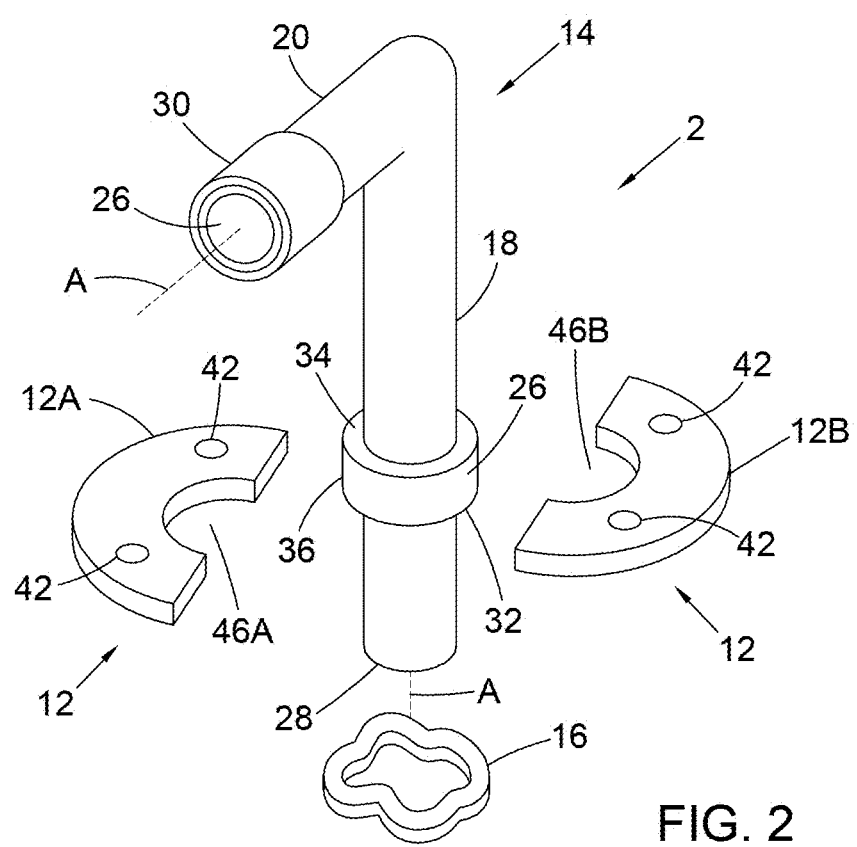
FIG. 2 shows an exploded view of an embodiment of a connection apparatus according to the present disclosure.
Figure 3:
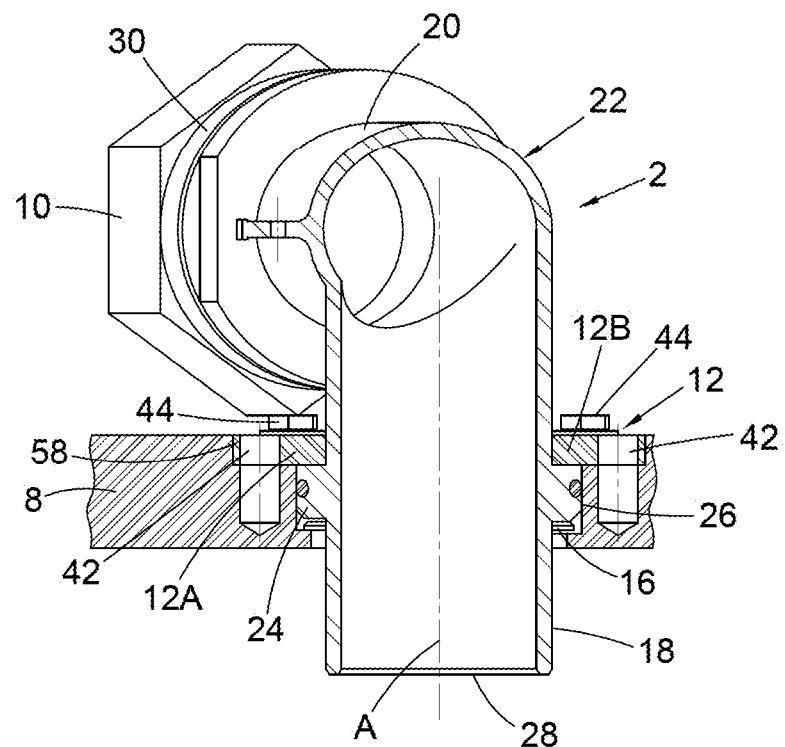
FIG. 3 shows a schematic partial sectional view of the connection system of FIG. 1.
Figure 4:
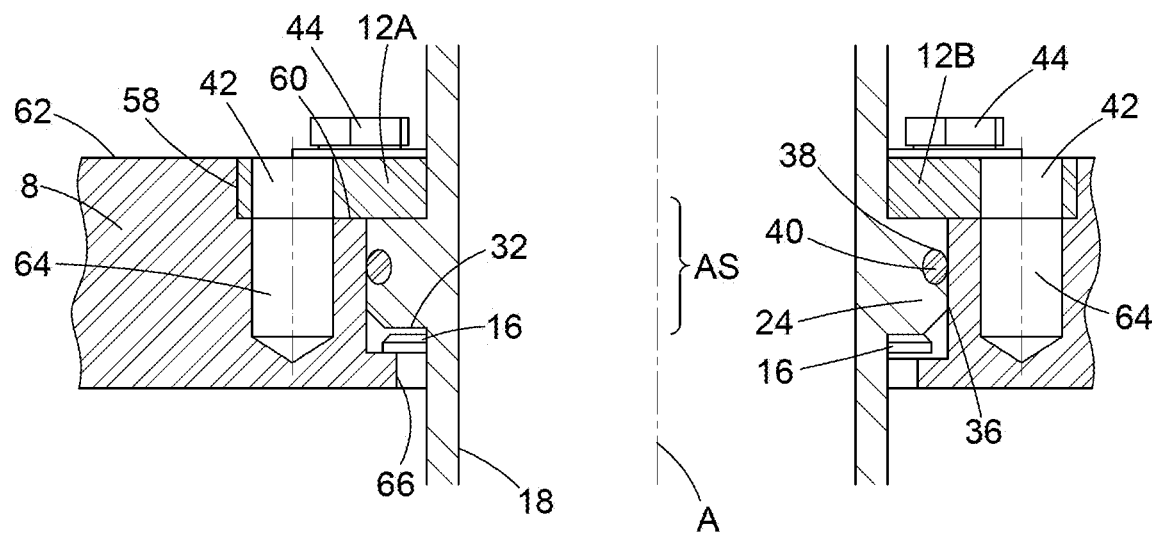
FIG. 4 shows an enlarged detail of FIG. 3.

With reference to FIGS. 2 to 4, the connection apparatus 2 comprises connector 14, a flange 12 and a compressible biasing means 16.

The connector 14 comprises a connection leg 18 and a connection arm 20 with an elbow 22 between and connecting the connection leg 18 and the connection arm 20. The connector 14 defines a substantially tubular void or conduit that extends along the connector 14 and has a port end 26 and a second end 28. A conduit axis A extends along the geometric centre of the conduit. The connector 14 has a circular or approximately circular cross-section in the plane perpendicular to the conduit axis A along the connection leg 18 and connection arm 20.

A shoulder 26 extends around a portion of the connector leg 18 in a radially outward and circumferential fashion. The shoulder 26 has first and second faces 32, 34 which are facing in an axial direction (in relation to the portion AS of conduit axis A around which shoulder 24 extends). The first and second shoulder faces 32, 34 are substantially parallel to each other.

Extending between the first and second shoulder faces 32, 34 is a circumferential face 36. A circumferential groove 38 houses a seal 40, for example an O-ring.

The flange 12 is a split flange comprised of first and second flange elements 12A, 12B. The flange elements 12A, 12B include a number of apertures 42 through which bolts 44 may extend. The first and second flange elements 12A, 12B are each configured to define half of an aperture 46A, 46B through which the portion of the connection leg 18 adjacent the shoulder face 34 may extend. The aperture 46A, 46B may be so dimensioned that the first and second flange elements 12A, 12B are in sliding contact with the contact leg 18 (as shown in FIG. 3), or may be spaced from the contact leg 18.

The biasing means 16 is a single turn wave spring. In other embodiments the biasing means 16 may be a helical compression spring, a multi-turn wave spring or a nested wave spring.

With reference to FIGS. 3 to 6, a connection system according to the present disclosure comprises the connection apparatus as described in connection with FIGS. 2 to 4 above, and a structural element 8.

Figure 5:
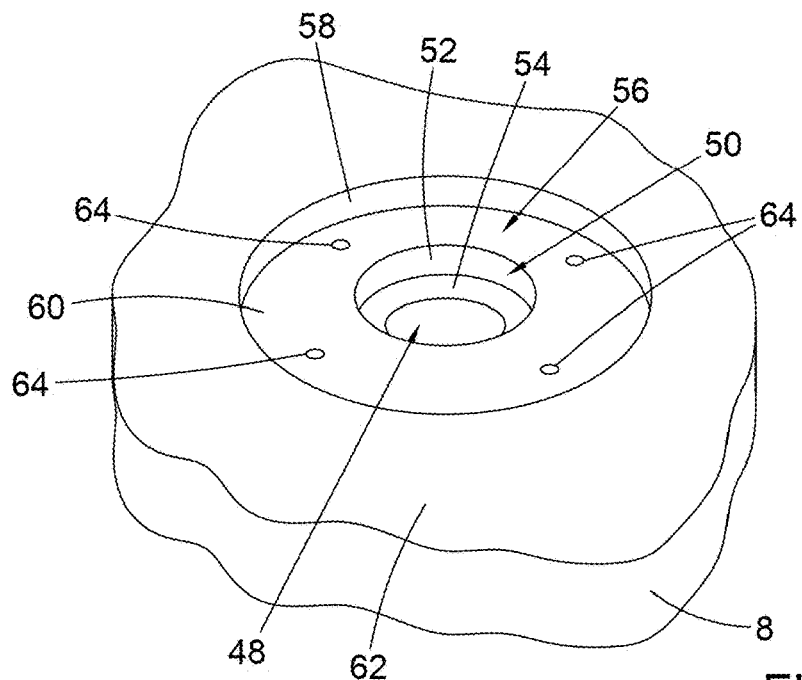
FIG. 5 shows a schematic view of an embodiment of a part of the structural element of FIG. 1.
Figure 6:
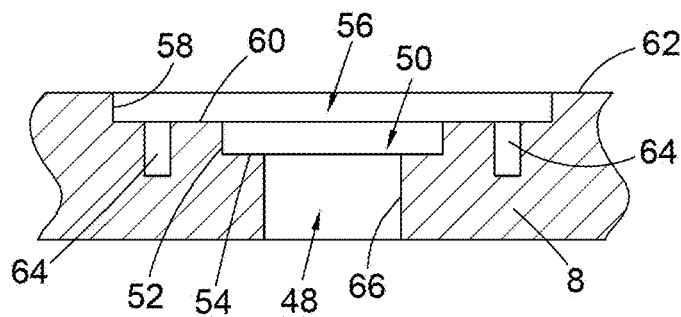
FIG. 6 shows a section structural element of FIG. 5.

With reference to FIGS. 5 and 6, the structural element 8 defines an aperture 48, a first recess 52, and a second recess 56.

The second recess 56 is a recess in the surface 62 of the structural element 8. The second recess 56 is defined by a second recess wall 58 and a second recess base 60. The second recess base 60 is substantially parallel to the surface 62 of the structural element 8 adjacent the second recess 56.

The second recess 56 is so dimensioned that the flange 12A, 12B can be received into the second recess 56 (as shown in FIGS. 3 and 4). Extending into the structural element 8 through the second recess base 60 are the same number of threaded bores 64 as there are apertures 42 in the first and second flange elements 12A, 12B. The threaded bores 64 are adapted to engage with the bolts 44 which pass through the apertures 42 to fix the flange 12 in the fixed position (shown in FIGS. 3 and 4).

Also extending into the structural element 8 through the second recess base 60 is the first recess 50. The first recess 50 is defined by a first recess wall 52 and a first recess base 54. The first recess base 54 is substantially parallel to the surface 62 of the structural element 8 adjacent the second recess 56.

The first recess 50 is so dimensioned that the shoulder 24 and biasing means 16 can be received into the first recess 50 (as shown in FIGS. 3 and 4). The first recess 50 may be so dimensioned that the shoulder 24 is in sliding contact with the first recess wall 52 (as shown in FIGS. 3 and 4). Alternatively, the shoulder 24 may be spaced from the first recess wall 52 to allow a degree of lateral movement of the connector 14 relative to the structural element 8.

Extending into the structural element 8 through the first recess base 54 is the aperture 48. The aperture 48 is defined by an aperture wall 66 and so dimensioned that the portion of the connection leg 18 between the shoulder 24 and second end 28 can pass through the aperture 48. The aperture 48 may be so dimensioned that the connection leg 18 is spaced from the aperture wall 66 (as shown in FIGS. 3 and 4).

The intersection of the aperture wall 66 and the first recess base 54 is spaced from the first recess wall 52. The portion of the recess bass 54 between the aperture wall 66 and the first recess wall 52 is of sufficient dimensions for the biasing means 16 to bare against the first recess wall 52 when the flange 12 is in the fixed position.

Figure 7:
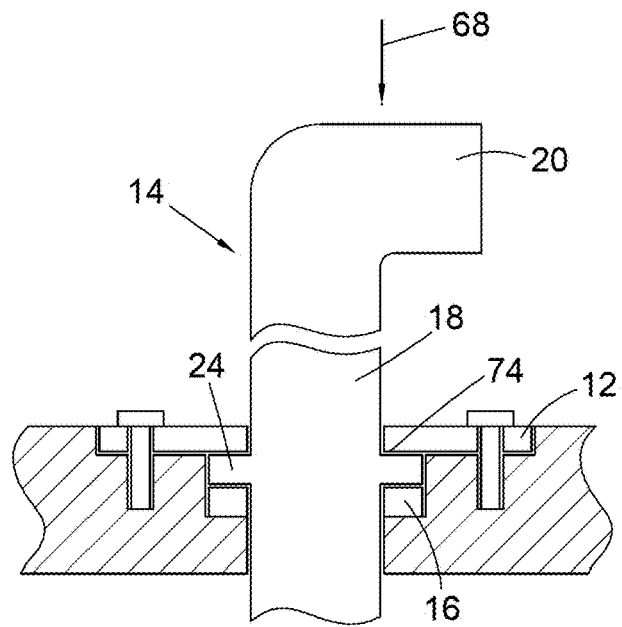
FIG. 7 shows a connector of the connection system of FIG. 1 in a first orientation.

With reference to FIGS. 7 to 10, the orientation of the connection arm 20 of the connection system may be altered as required once the biasing means 16 and connector 14, in particular the shoulder 24, are trapped in the structural element 8 by the flange 12 as shown in FIG. 7. The biasing means 16 is partially compressed and is forcing the shoulder against the face 74 of the flange 12.

Figure 8:
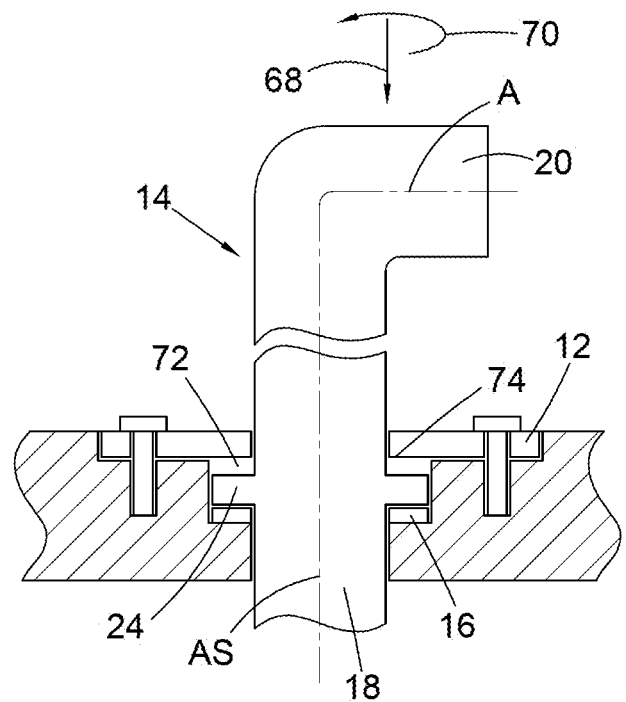
FIG. 8 shows the connector of FIG. 7 with the biasing means being compressed by a user.
Figure 9:
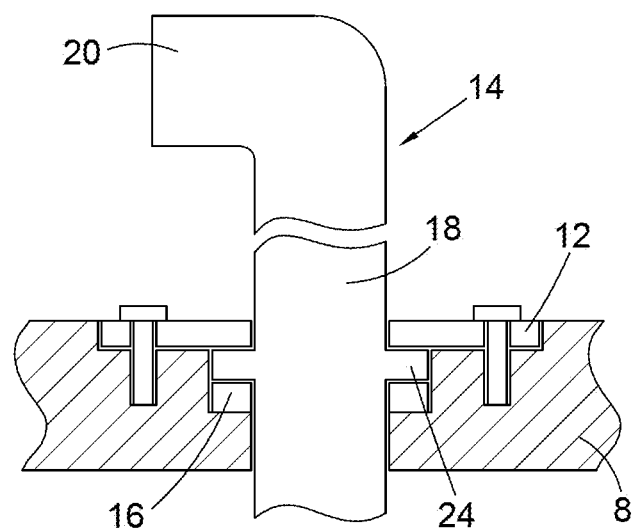
FIG. 9 shows the connector of FIG. 7 in a second orientation.

To reorient or realign the connection arm a user applies force to the connector 14 in the direction of the arrow 68. That force causes the biasing means 16 to further compress and the shoulder 24 to move away from the face 74 of the flange 12 to create a space 72 as shown in FIG. 8. The user then applies a rotational force shown by arrow 70 to the connector 14. The rotational force causes the connector 14 to rotate around the portion AS of the conduit axis A. this causes the connection arm 20 to become orientated as shown in FIG. 9.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the connection system and connection apparatus disclosed in the embodiment may be used alone, in combination, or in a variety of arrangements not specifically discussed in the embodiment described above. This disclosure is therefore not limited in its application to the details and arrangement of components set forth in the foregoing description or illustrated in the drawings. Although a particular embodiment has been shown and described, it will be obvious to those skilled in the art that changes and modifications may be made without departing from this invention in its broader aspects. The scope of the following claims should not be limited by the embodiments set forth in the example, but should be given the broadest reasonable interpretation consistent with the description as a whole.

The invention claimed is:

1. A connection apparatus suitable for mounting on a structural element and connection to a port of a system or component, the connection apparatus comprising: a monolithic connector that forms a longitudinally extending conduit having an axis (A) extending along the center of the conduit, a port end adapted to be engaged with the port of a system or component, and a second end that entirely passes configured to pass through the structural element, the connector comprises a shoulder extending around a perimeter of the connector, the shoulder extends around the perimeter of the connector in a direction substantially perpendicular to a portion (AS) of the conduit axis (A) around which the shoulder extends; biasing means adapted to at least partially extend around a portion of the connector adjacent to the shoulder; and a flange, wherein the flange is adapted to at least partially extend around a portion of the connector adjacent to the shoulder between the shoulder and the port end of the connector, and to be fixed to the structural element in a fixed position, the flange, shoulder and biasing means are so configured that fixing the flange to the structural element in the fixed position traps the shoulder and the biasing means between the flange and the structural element and the second end passes through the structural element, and the biasing means is partially but not fully compressed when the flange is in the fixed position; wherein the biasing means is configured such that the partial but not full compression of the biasing means causes the biasing means to bias the shoulder against the structural element or flange and that bias is sufficient to inhibit the connector from moving laterally or rotationally relative to the flange; wherein the biasing means is configured so that it can be further compressed by application of a force to the connector, in which at least part of the force is applied in the same direction as the portion (AS) of the conduit axis (A) around which the shoulder extends; wherein the structural element comprises a first recess, wherein the first recess extends around an end of a passage in the structural element, and the first recess is configured to receive the shoulder; wherein the structural element comprises a second recess, wherein the second recess is configured to receive the flange, and the second recess extends around the first recess.

2. An apparatus according to claim 1, wherein the biasing means is located between the shoulder and the second end of the connector.

3. An apparatus according to claim 1, wherein the biasing means is located between the shoulder and the flange.

4. An apparatus according to claim 1, the biasing means is a compression spring.

5. An apparatus according to claim 1, the biasing means is a wave spring.

6. An apparatus according to claim 1, the flange is a split flange.

7. An apparatus according to claim 1, the conduit defined by the connector comprises the port end, the second end, and at least one further aperture through which communication with the conduit may occur.

8. A connection system according to claim 1, wherein the structural element comprises the passage through which the portion of the connector between the shoulder and the port end or the second end extends, and through which the shoulder does not pass.

9. A connection system according to claim 1, wherein the passage, the first recess and the second recess each define a cylindrical volume, and those cylindrical volumes are coaxial.

* * * * *